(12) United States Patent
Galle et al.

(10) Patent No.: US 7,787,127 B2
(45) Date of Patent: Aug. 31, 2010

(54) SYSTEM AND METHOD TO DETERMINE CHROMATIC DISPERSION IN SHORT LENGTHS OF WAVEGUIDES USING A COMMON PATH INTERFEROMETER

(76) Inventors: Michael Galle, 29 Topham Crescent, Richmond Hill, ON (CA) L4C 9G8; Waleed Mohammed, 29 Topham Crescent, Richmond Hill, ON (CA) L4C 9G8; Li Qian, 800 Crawford Street, Toronto, ON (CA) M6G 3K3

( * ) Notice: Subject to any disclaimer, the term of this patent is extended or adjusted under 35 U.S.C. 154(b) by 18 days.

(21) Appl. No.: 11/872,395

(22) Filed: Oct. 15, 2007

(65) Prior Publication Data
US 2009/0097036 A1  Apr. 16, 2009

(51) Int. Cl.
*G01B 9/02* (2006.01)
(52) U.S. Cl. ............................. 356/477; 356/73.1
(58) Field of Classification Search ............. 356/454, 356/519, 73.1, 477, 481, 480, 517; 385/12
See application file for complete search history.

(56) References Cited

U.S. PATENT DOCUMENTS

| | | | |
|---|---|---|---|
| 5,179,420 A * | 1/1993 | So et al. ............... 356/73.1 |
| 5,357,333 A * | 10/1994 | DeBernardi et al. ........ 356/73.1 |
| 5,956,131 A * | 9/1999 | Mamyshev et al. ......... 356/73.1 |
| 6,697,150 B1 * | 2/2004 | Galtarossa et al. ......... 356/73.1 |
| 2004/0046964 A1 * | 3/2004 | Brendel ...................... 356/477 |
| 2005/0179889 A1 * | 8/2005 | Schiano ..................... 356/73.1 |

* cited by examiner

*Primary Examiner*—Tarifur Chowdhury
*Assistant Examiner*—Jonathan M Hansen

(57) ABSTRACT

The present invention relates to a system and method to determine chromatic dispersion in short lengths of waveguides using a two wave interference pattern and a common path interferometer. Specifically the invention comprises a radiation source operable to emit radiation connected to a means for separating incident and reflected waves; the means for separating incident and reflected waves possessing an output arm adjacent to a first end of the waveguide; and the means for separating incident and reflected waves further connected to an optical detector operable to record an interference pattern generated by a reflected test emission from the radiation source. The interference pattern consists of two waves: one reflected from a first facet of a waveguide and the second reflected from a second facet of the same waveguide.

26 Claims, 3 Drawing Sheets

SYSTEM AND METHOD TO DETERMINE CHROMATIC DISPERSION IN SHORT LENGTHS OF WAVEGUIDES USING A COMMON PATH INTERFEROMETER

FIELD OF THE INVENTION

This invention relates to a system and method to determine chromatic dispersion in short lengths of waveguides using a two wave interference pattern and a common path interferometer.

BACKGROUND OF THE INVENTION

One of the main components in a photonic device is a waveguide such as an optical fiber which serves as a low-loss medium for light transmission. An important characteristic of a waveguide such as optical fiber is the dispersion that light experiences as it travels inside the fiber. Dispersion is the phenomenon that causes different frequencies of light to travel at different velocities. The phenomenon of dispersion is commonly observed through the spreading of light by a prism. When white light, which contains a broad spectrum of frequencies, enters a prism the different wavelengths are bent at different angles since each frequency sees a different index of refraction, a phenomenon first quantified by Newton in the 17th century. Inside a fiber this variation in the index of refraction with frequency is what causes the frequency dependence of the velocity.

A more modern example of the phenomenon of dispersion is the affect it has on the performance of photonic devices used in communication systems. In these systems, dispersion, or more specifically second order dispersion, leads to a broadening of the pulses used to represent 1 or 0 in a digital communication system. Pulse broadening causes adjacent bits to overlap and leads to intersymbol interference. Intersymbol interference occurs when a pulse is broadened beyond its allocated bit slot to such an extent that it begins to overlap with adjacent bits and it is no longer possible to determine whether or not a specific bit contains a 1 or a 0.

As a result of intersymbol interference the allocated bit slots must be widened and this effectively lowers the number of bits that can be transmitted in a given period of time and reduces the system bandwidth. As a result modern communication systems have evolved methods to mitigate the effects of dispersion.

Current methods of countering the effects of dispersion in an optical fiber use dispersion compensating devices such as chirped fiber Bragg gratings and dispersion compensating fiber (DCF). In order to effectively use these techniques it is important to know the exact magnitude of the dispersion that is being compensated for. As a result knowledge of the dispersion in both the transmission system and the dispersion compensation system is important to the design of the overall communication system.

Knowledge of dispersion in a fiber is also significant for the study of fiber based nonlinear wave interaction phenomena. An optical soliton is a pulse that maintains a constant shape (width) as it propagates along a fiber (first order soliton) or has a shape that is periodic with propagation (higher order soliton). This is due to the fact that the effects of dispersion and self phase modulation (SPM) are in balance. SPM is the effect whereby the phase of a given pulse is modified by its own intensity profile. Knowledge of the dispersion in an optical fiber allows for the determination of the required intensity for the formation of an optical soliton. This effect has also been used in the area of soliton effect pulse compression where the combination of the chirping effect of SPM and subsequent distributed compression effect of negative dispersion is used to compress an optical pulse. Knowledge of dispersion is also important for the study of nonlinear effects such as second harmonic generation, three-wave mixing and four-wave mixing since it determines the interaction lengths between the various wavelengths. Dispersion is particularly important in techniques that aim to extend this interaction length such as in Quasi Phase Matching (QPM) devices.

Theory on Chromatic Dispersion of a Waveguide

Dispersion is the phenomenon whereby the index of refraction of a material varies with the frequency or wavelength of the radiation being transmitted through it. The term 'Chromatic Dispersion' is often used to emphasize this wavelength dependence. The total dispersion in a waveguide or an optical fiber is a function of both the material composition (material dispersion) and the geometry of the waveguide (waveguide dispersion). This section outlines the contributions of both material and waveguide dispersion, identifies their physical source and develops the mathematical terminology for their description.

Dispersion in a Waveguide

When light is confined in an optical fiber or waveguide the index is a property of both the material and the geometry of the waveguide. The waveguide geometry changes the refractive index via optical confinement by the waveguide structure. The refractive index is therefore a function of both the material and waveguide contributions. For this reason in a fiber or a waveguide the index is known as an effective index.

Material Dispersion

Material dispersion originates from the frequency or wavelength dependent response of the atoms/molecules of a material to electromagnetic waves. All media are dispersive and the only non-dispersive medium is vacuum. The source of material dispersion can be examined from an understanding of the atomic nature of matter and the frequency dependent aspect of that nature. Material dispersion occurs because atoms absorb and re-radiate electromagnetic radiation more efficiently as the frequency approaches a certain characteristic frequency for that particular atom called the resonance frequency.

Waveguide Dispersion

Waveguide dispersion occurs because waveguide geometry variably affects the velocity of different frequencies of light. More technically, waveguide dispersion is caused by the variation in the index of refraction due to the confinement of light an optical mode. Waveguide dispersion is a function of the material parameters of the waveguide such as the normalized core-cladding index difference, $\Delta=(n_{core}-n_{cladding})/n_{core}$, and geometrical parameters such as the core size, a. The index in a waveguide is known as an effective index, $n_{\mathit{eff}}$, because of the portion of the index change caused by propagation in a confined medium.

In most cases the main effect of the waveguide dispersion in standard single mode fibers is a reduction in dispersion compared to dispersion in bulk. In comparison to material dispersion the contribution of waveguide dispersion is quite small and in most standard single mode fibers it only shifts the zero dispersion wavelength from 1276 nm to 1310 nm.

In summary, the dispersion in a waveguide or an optical fiber is caused not only by the material but also by the effect of confinement and propagation in the waveguide. Thus accurate knowledge of the dispersion in a waveguide cannot be made by simple knowledge of the material dispersion but must include the effect of the waveguide. As a result either the dimensions of the waveguide must be known to a high degree of accuracy so that the waveguide dispersion can be calculated (which is not easy since fabrication processes are hardly perfect) or the dispersion must be measured empirically. Accurate measurement of the (total) dispersion parameter, D, is important to the design of photonic systems.

Conventional Measurement Techniques

There are 3 categories of dispersion measurement techniques: Time of flight (TOF), Modulation phase shift (MPS) and Interferometric. TOF and MPS are the most widely used commercial dispersion measurement techniques. Interferometric techniques are not widely used commercially but have been used in laboratories for dispersion measurements. Interferometric techniques come in two forms; temporal and spectral. The existing techniques differ in measurement precision and fiber length requirements.

Time of Flight Technique

In the TOF technique the second order dispersion parameter can be determined either by measuring the relative temporal delay between pulses at different wavelengths or by measuring the pulse broadening itself. The relative temporal delay between pulses at different wavelengths is measured to determine the group velocity which can then be used to determine the second order dispersion parameter using Eq. A:

$$D(\lambda_o) = \frac{\Delta t}{L \Delta \lambda(\lambda_o)} \quad \text{Eq. A}$$

The above equation can also be used to determine the second order dispersion parameter from the pulse broadening itself if $\Delta t$ is the measured pulse broadening and $\Delta \lambda$ is the bandwidth of the wavelengths in the pulse. The measurement precision achievable by the TOF technique is on the order of 1 ps/nm.

One of the main problems with the TOF technique is that it generally requires several kilometres of fiber to accumulate an appreciable difference in time for different wavelengths. Another issue with the TOF technique when the pulse broadening is measured directly is that the pulse width is affected by changes in the pulse shape which leads to errors in the measurement of the second order dispersion parameter. As a result, in order to measure the second order dispersion parameter with a precision near 1 ps/nm-km several kilometres of fiber are required.

Modulation Phase Shift Technique

The MPS technique is another dispersion characterization technique that requires long lengths of fiber. In the MPS technique, a continuous-wave optical signal is amplitude modulated by an RF signal, and the second order dispersion parameter is determined by measuring the RF phase delay experienced by the optical carriers at the different wavelengths.

The RF phase delay information is extracted by this technique, and by taking the second derivative of the phase information, the second order dispersion parameter can be determined. Measurement precision achievable by the MPS technique is in the order of 0.07 ps/nm. Due to its higher precision, MPS has become the industry standard for measuring dispersion in optical fibers. However, MPS has several disadvantages. The first is that it is expensive to implement since the components required such as an RF analyzer and a tunable laser, are costly. The second is that its precision is limited by both the stability and jitter of the RF signal.

MPS has several limitations on the minimum device length that it is capable of characterizing. In the MPS method the width of the modulated signal limits the minimum characterizable device length. This method also typically requires fiber lengths in excess of tens of meters to obtain a precision to better than 1 ps/nm-km. Therefore it is not desirable for the characterization of specialty fibers or gain fibers, of which long fiber lengths are expensive to acquire or not available. Also, when fiber uniformity changes significantly along its length, the dispersion of a long span of fiber cannot be used to accurately represent that of a short section of fiber. In such cases, dispersion measurement performed directly on short fiber samples is desirable. As a result a technique for measuring the dispersion of short lengths of fiber is desired.

Dispersion Measurements on Short Length

Interferometric techniques are capable of characterizing the dispersion on fiber lengths below 1 m. There are two categories of interferometric techniques for making dispersion measurements on fiber of short length: temporal and spectral.

Temporal Interferometry (Fourier Transform Spectroscopy)

Dual Arm temporal interferometry employs a broadband source and a variable optical path to produce a temporal interferogram between a fixed path through the test fiber and variable air path. It involves moving one arm of the interferometer at a constant speed and plotting the interference pattern as a function of delay length (time). The spectral amplitude and phase are then determined from the Fourier transform of the temporal interferogram.

A temporal interferogram gives the phase variation as a function of time. The spectral phase variation can be extracted from the temporal interferogram if a Fourier Transform is applied to it. The spectral phase contains the dispersion information which can be indirectly obtained by taking the second derivative of the spectral phase. A precision of 0.0015 ps/nm measured on a 0.814-m-long photonic crystal fiber was recently reported using temporal interferometry. The main disadvantage of temporal interferometry is that it is susceptible to noise resulting from both translation inaccuracy and vibration of the optics in the variable path. A tracking laser is typically required to calibrate the delay path length. Another problem with this technique is that a second derivative of the phase information must be taken to obtain the second order dispersion parameter which means that it is less accurate than a method that can obtain the dispersion parameter directly.

Spectral Interferometry

Spectral interferometry, like temporal interferometry, is capable of characterizing the dispersion in short length fiber (<1 m). In spectral interferometry, instead of stepping the length of one of the arms, a scan of the wavelength domain performed to produce a spectral interferogram. Spectral interferometry is generally more stable than temporal interferometry since the arms of the interferometer are kept stationary. Thus it is simpler than temporal interferometry since no tracking laser is necessary.

There are two types of spectral interferometry, one is general and does not require balancing, and another, the special case, is 'balanced'. In the balanced case it is possible to directly measure the second order dispersion parameter from the interferogram. This makes it more accurate than temporal interferometry and it is for this reason that spectral interferometry is discussed as a dispersion measurement technique.

In general spectral interferometry the second order dispersion parameter is obtained from the interference spectrum produced by two time delayed light pulses/beams in an unbalanced dual arm interferometer. Two pulses/beams from the two arms of the interferometer are set up to interfere in a spectrometer and a spectral interferogram is produced.

There are several ways to extract the phase information from the spectral interferogram but the most prevalent way to do so is to take its Inverse Fourier transform. The result is band-pass filtered, followed by applying a Fourier Transform. This gives the phase difference spectrum, the second derivative of which gives the second order dispersion parameter.

The main issue with this form of spectral interferometry, however, is that the dispersion parameter is not determined directly but rather via a second order derivative of the phase information with respect to wavelength. Therefore, like temporal interferometry, this general unbalanced form of spectral interferometry is not as accurate as the method capable of measuring the dispersion parameter directly which is now discussed.

In balanced spectral interferometry the arm lengths of an interferometer are kept constant and they are balanced for a given wavelength called the central wavelength such that the group delay in both arms is the same. This allows for the removal of the effect of the large linear dispersion term in the interferogram. Balanced interferometry measures the second order dispersion parameter at the wavelength at which the group delay is the same in both arms. This wavelength is henceforth referred to as the central wavelength. The second order dispersion parameter in this case can be directly determined from the phase information in the spectral interferogram without differentiation of the phase. For this reason it is more accurate than both unbalanced general spectral interferometry and temporal interferometry.

Both forms of spectral interferometry are considered to be less susceptible to noise since the arms of the interferometer are kept still and there are no moving parts. It is for this reason that spectral interferometry in general is considered to be more accurate than temporal interferometry. Spectral interferometry is therefore considered to be the technique of choice for measuring the dispersion of photonic components and spectral depth resolved optical imaging. One well known and important class of spectral interferometry is optical coherence tomography (OCT).

Balanced dual arm spectral interferometers are typically in a Michelson or a Mach Zehnder configuration in which the path lengths are equalized at the given wavelength in which the dispersion is to be measured. These interferometers are shown in FIG. 1. The most often used configuration, however, is the Michelson and the discussion that follows considers the Michelson interferometer. In a balanced Michelson interferometer the dispersion is measured from the interference between two waves: one that passes through the test fiber and another that passes through an air path. Balancing the air path length with the fiber eliminates the effect of the group index of the fiber in the interference pattern. This allows for the measurement of the second derivative of the effective index with respect to wavelength directly from the interference pattern.

The main disadvantage of this configuration is that, for this to work, two types of path balancing must occur simultaneously. The path lengths of both arms coming out of the coupler (highlighted in red) need to be balanced exactly or an extra set of interference fringes will be created from the reflections at the two end facets of the coupler arms.

The second type of balancing is test fiber-air path balancing to ensure that the optical path length in the air path exactly equals that of the fiber for a given central wavelength. This ensures that the central wavelength in the interference pattern is within the viewable bandwidth of the OSA.

The main problem in implementing a Michelson interferometer is that the arms of the coupler cannot be balanced exactly and as a result the effect of the extra set of reflections produced at the coupler facets cannot be removed.

Additionally, conventional two-arm interferometry using, for example, Mach-Zehnder or Michelson interferometers, requires polarization and phase stabilization. Though accurate effective index measurement can be done using a coupling grating with a known period, this method is destructive, and cannot be used to measure over a large bandwidth, and thus cannot measure quadratic dispersion. To measure dispersion, the authors in E. Dulkeith, F. Xia, L. Schares, W. Green, Y. Vlasov, "Group index and group velocity dispersion in silicon-on-insulator photonic wires", Opt. Exp., 14, (2006), introduced an integrated Mach-Zehnder interferometer to measure the chromatic dispersion in silicon on insulator waveguides. This method requires fabrication of the interferometer on the device itself. To date, there has not been a non-destructive single-arm interferometric technique for linear and quadratic dispersion characterization of both fibers and waveguides.

Therefore, what is needed is a new method for the measurement of dispersion that does not require balancing. What is also needed is a method to measure the dispersion parameter in short lengths of optical fiber. What is also needed is a non-destructive method to measure dispersion.

SUMMARY OF THE INVENTION

According to the present invention, a system and method to determine chromatic dispersion in short lengths of waveguides using a two wave interference pattern and a common path interferometer has been developed.

In a first aspect, the present invention relates to an interferometer system for obtaining a measure of the chromatic dispersion of a waveguide comprising a radiation source operable to emit radiation connected to a means for separating incident and reflected waves; the means for separating incident and reflected waves possessing an output arm adjacent to a first end of the waveguide; and the means for separating incident and reflected waves further connected to an optical detector operable to record an interference pattern generated by a reflected test emission from the radiation source.

In a second aspect of the present invention, the interference pattern consists of two waves wherein a first wave is a refection of the test emission from a first facet of the waveguide and a second wave is a reflection of the test emission from a second facet of the waveguide.

In a still further aspect, the present invention relates to a method for obtaining a measure of the chromatic dispersion of a waveguide comprising the steps of:
  a. connecting a radiation source to a means for separating incident and reflected waves, said means for separating incident and reflected waves having an output arm comprising a launch waveguide terminating at an angle polished connector;
  b. placing a first facet of the waveguide adjacent to the angle polished connector;
  c. connecting the means for separating incident and reflected waves to an optical detector;
  d. generating a radiation emission from the radiation source;
  e. recording an interferogram consisting of two waves with the optical detector wherein a first wave is a reflection of the radiation emission from the first facet of the waveguide and a second wave is a reflection of the radiation emission from a second facet of the waveguide; and f. measuring dispersion parameters from the recorded interferogram.

BRIEF DESCRIPTION OF THE DRAWINGS

The invention will be better understood with reference to the drawings.

The accompanying drawings, which are incorporated in and constitute a part of the specification, illustrate various example systems and methods and are not intended to limit the scope of the specification.

DETAILED DESCRIPTION OF THE INVENTION

Overview

Figure 1:
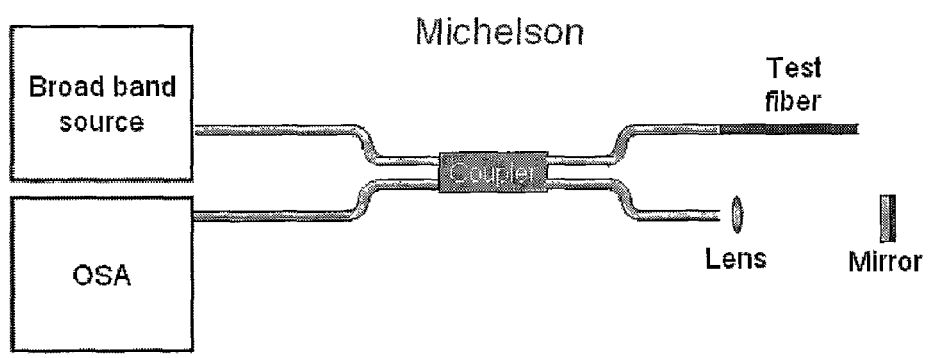
FIG. 1 illustrates the schematic representation of typical Michelson and Mach-Zehnder Interferometers.
Figure 1:
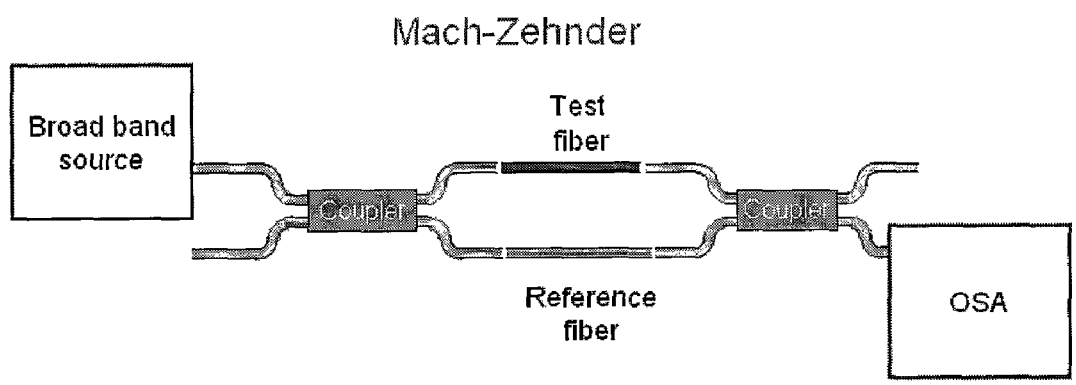

A Single Arm Interferometer (SAI) or common path interferometer can be produced by folding the two arms, of a Michelson interferometer together into a single or common path (11). It should also be noted that the mirror that appears in the Michelson system (see FIG. 1) is not required and does not appear in the system configuration for the present invention (see FIG. 2). This present configuration was designed to minimize the calibration step required by dual arm interferometers in which the coupler arms are made to be disproportionate in length to minimize the effect of the extra reflections from the coupler-test fiber/coupler-air path facets. In addition, this present configuration also minimizes the need to balance the air path length with that of the fibre. Since calibration is not required this technique is also more accurate than a dual arm interferometer.

System Configuration

An interferogram is a waveform generated when two or more waves interfere with each other, either constructively or destructively. It is known to those skilled in the art that optical dispersion may be determined from particular types of interferograms. Specifically, the present invention generates a Fabry-Pérot interference fringe pattern (31) or interferogram due to the interference of two reflecting wave fronts (23, 25).

Figure 2:
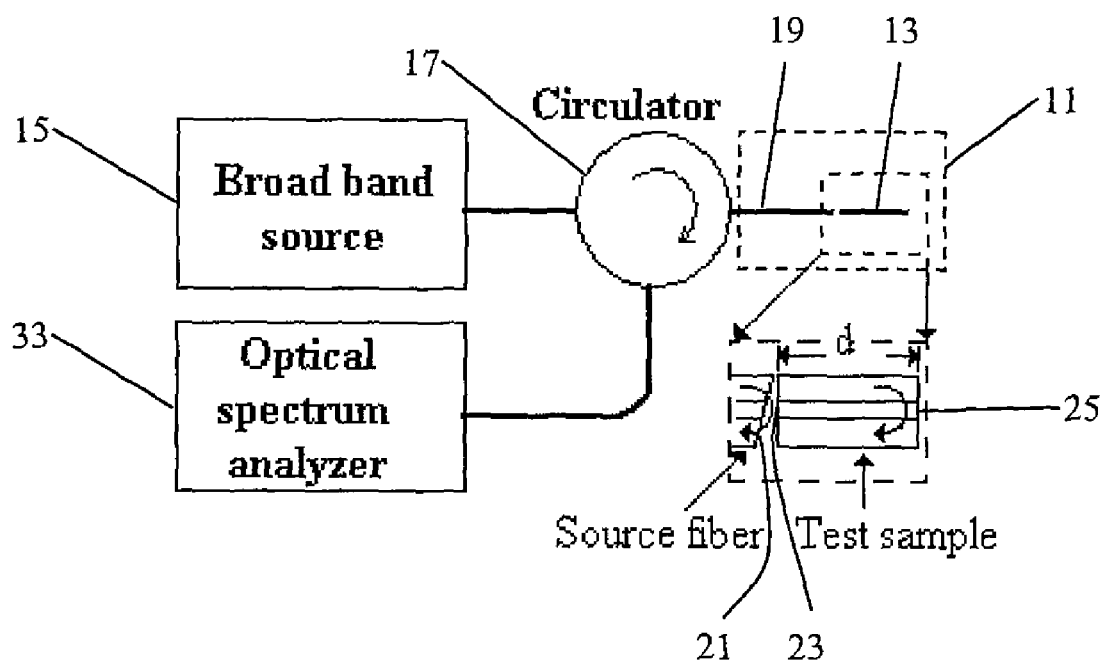
FIG. 2 illustrates the schematic representation of a possible implementation using the single-arm interferometer.

The common path interferometer of the present invention may be used to measure dispersion in short waveguides. The system may be configured as a radiation source connected to a means for separating incident and reflecting waves. As depicted in FIG. 2, the radiation source may be a broad band source (15) and the means for separating incident and reflecting waves may be, for example, a circulator (17) or a 2-to-1 coupler. For simplicity, both a broad band source (15) and a circulator (17) will be used to explain the embodiment of the present invention. The output arm (19) of the circulator (17) is spliced to form an angle cleaved fiber (21) connector to minimize the reflection at this facet. The test sample (fiber or waveguide) (13) is connected adjacent to the angle cleaved fiber (21) as shown in FIG. 2.

The broad band source (15) generates an optical signal that enters the circulator (17). The optical signal then travels through the output arm (19) of the circulator (17) to the adjacently placed test sample (13) by way of the angle polished connector (21) that is operable to minimize reflection at the end facet of the output arm (19). The optical signal then travels through the test sample (13). The signal is reflected, at some degree of attenuation greater than or equal to zero, at each of the two facets (23, 25) of the test sample (13). The circulator (17) is operable to direct the reflected optical signal to the detector (33).

Figure 3:
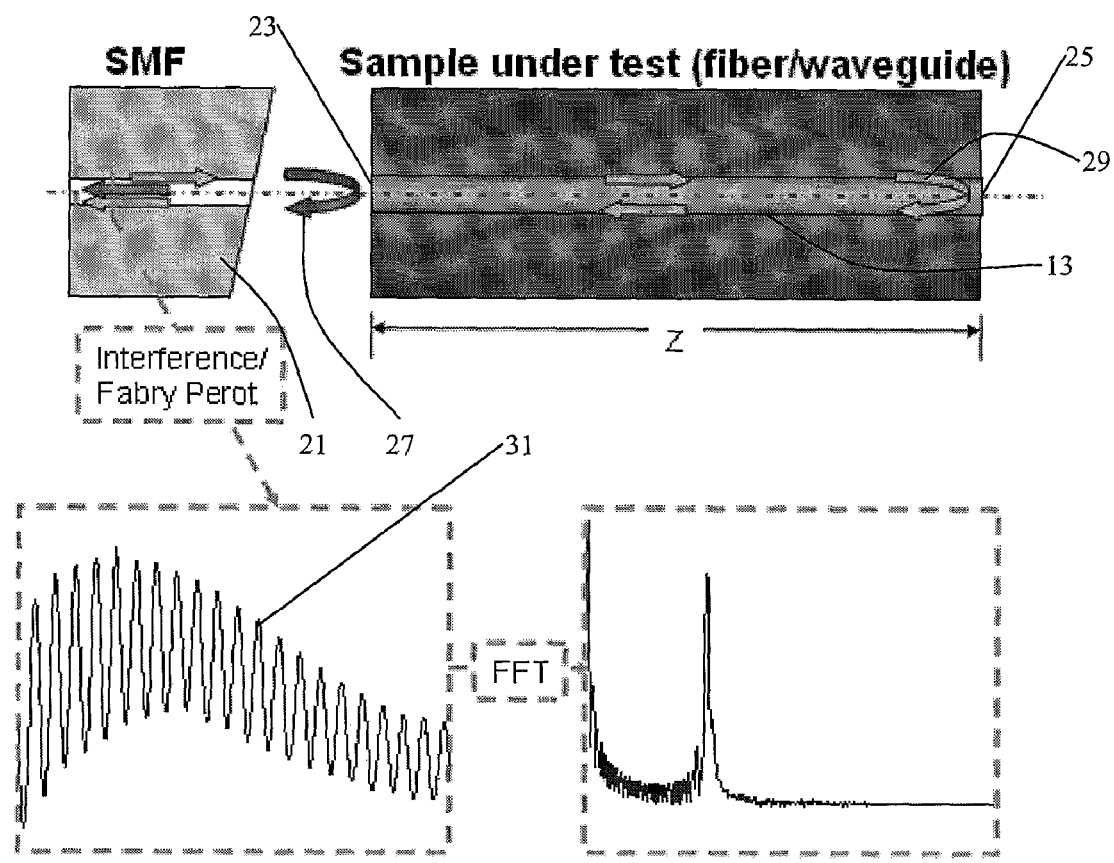
FIG. 3 illustrates the process of generating the Fabry-Perot interferogram using the single-arm interferometer.

The reflected Fabry-Pérot interference fringe pattern is caused by multiple reflections from both facets (23, 25) of the waveguide (13) being tested, as shown in FIG. 3. The first reflection (27) is generated from the facet of the first end (23) of the sample waveguide (13) (adjacent to the cleaved output arm of the circulator), while the second reflection (29) is generated by the end facet (25) of the sample waveguide (13). The generated interference pattern or Fabry-Pérot interferogram (31) is then recorded using an optical spectrum analyzer (OSA) (33).

The resolution of spectral interferometry can be improved by replacing the combination broadband source (15) and Optical Spectrum Analyzer (33) shown in FIG. 2 with a tunable laser and detector system. Current tunable laser technology allows for a bandwidth of 130 nm and a 1 picometer resolution. This improves the range of fiber lengths that can be measured using this technique. Also of note is that the use of tunable lasers for dispersion measurement is becoming more widespread as they decrease in cost.

Mathematical Analysis

The goal of the analysis is to extract as accurately as possible the first derivative of the propagation constant, $\beta_1$, directly from the fringe pattern and then to determine the second derivative $\beta_2$ using a Taylor expansion. This analysis will give the second order dispersion parameter, D, which can be expressed in terms of $\beta_1$ and $\beta_2$ as follows:

$$D = -\frac{\lambda}{2\pi c}(2\beta_1 + \lambda\beta_2)$$

$\beta_2$ is usually very small and hence it is important to minimize the measurement uncertainty. One way of minimizing the uncertainty is to divide the total range into a number of overlapping wavelength band, and assume a fixed period in each band (moving average). This assumption is valid when $$\Delta\lambda << \frac{2\beta_1(\lambda_o)}{\beta_2(\lambda_o)} \text{ or } \Delta\lambda \leq \frac{0.02\beta_1(\lambda_o)}{\beta_2(\lambda_o)} \quad (1)$$

$\Delta\lambda$ is the band width and $\lambda_o$ is the central wavelength. In Eq. 1 $\Delta\lambda$ is arbitrarily selected to be two orders of magnitudes less than the right hand side. Writing $\beta_1$ and $\beta_2$ in terms of the second order dispersion parameter, D, and the group index, $N_g$, we obtain $$\Delta\lambda \leq \frac{\lambda_o}{100 \cdot \left|\frac{\lambda_o cD}{2N_g} - 1\right|} \quad (2)$$

where c is the speed of light in vacuum. Under this assumption, $\beta_1$ at the center of each band can be measured either directly from the average fringe period, $L_o$, (Eq. 3) or through Fourier analysis.

$$\beta_1(\lambda_o) = \frac{\pi}{L_o d} \quad (3)$$

Using Fourier analysis, the Fabry-Pérot intensity distribution can be written as a Fourier series expansion as follows $$I(\lambda)=1-I_{max}[a_0+a_1\cos(2(\lambda-\lambda_o)\beta_1 d)+a_2\cos(4(\lambda-\lambda_o)\beta_1 d)+\ldots] \quad (4)$$

where, $a_0$, $a_1$ and $a_2$ are the expansion coefficients, d is the length of the waveguide and $I_{max}$ is the maximum intensity. The Fourier transform of Eq. 4 gives several peaks. $\beta_1$ can be measured directly from the location of the first peak, $m_p$, as follows.

$$\beta_1(\lambda_o) = \frac{\pi m_p}{\delta\lambda M d} \quad (5)$$

M is the total number of samples in the Fourier domain and $\delta\lambda$ is the wavelength sampling step $$\left(\delta\lambda = \frac{\Delta\lambda}{M}\right).$$

Both methods return $\beta_1$ across the total wavelength range with a coarse wavelength resolution that equals the separation between the centers of the small bands. A at each wavelength, $\lambda_o$, is calculated by fitting $\beta_1(\lambda)$ to a second order polynomial around $\lambda_o$ $$\beta_1(\lambda)=p_0+p_1(\lambda-\lambda_o)+p_2(\lambda-\lambda_o)^2 \quad (6)$$

$p_0$, $p_1$ and $p_2$ are the zeroth order, first order and second order fitting coefficients. Compared to Taylor expansion, $\beta_2(\lambda_o)=2p_1$.

2: Experimental Verification 2.1 Experimental Process

The first step in the experiment is to set up the Single Arm Interferometer and to assemble the control and data acquisition hardware. The second step in the experiment is to test the technique by using it to measure the dispersion of fibers for which the dispersion curves are known or that can easily be measured using conventional techniques.

The Single Arm Interferometer measured the dispersion parameters for two different samples: 6 mm twin-hole fiber and 2.88 mm AlGaAs waveguide. The fiber sample consists of two air holes 45 µm radius each and a 4 µm radius Ge doped silica core located closer to one of the holes. The waveguide is a 1.5 µm $Al_{0.18}Ga_{0.82}As$ core layer, surrounded above and below by $Al_{0.24}Ga_{0.76}$ as cladding layers (1.5 µm above, and 4.0 µm below), grown on a GaAs substrate. The in-plane confinement was achieved by photolithography and dry etching of 3.5 µm wide and 2 µm deep ridge. The maximum sub-band widths for the fiber and waveguides samples (from Eq. 2) are 4.17 nm and 11.85 nm respectively (for the fiber sample we borrowed the dispersion parameters form the standard SMF-28.) In the following analysis a 3 nm sub-band width was used for data analysis on both samples.

In measuring $\beta_1$ and $\beta_2$, the sources used were a broadband erbium-fiber ASE source (50 nm bandwidth) for the fiber case and a lower power Agilent 83437A™ broad band source (250 nm) for the waveguide measurements. The broader band source was not used with the fiber due to the low Fresnel reflection (0.04 compared to 0.25 in the waveguide.) For both cases, the recorded fringes did not suffer from phase drifting, and hence additional phase stabilization steps were not needed. Analyzing the recorded fringes pattern using the direct measurement of $L_o$, a peak finding technique is applied after smoothing the data (20 points moving average over a 3000 points window). The average of the differences of the consecutive peaks is $L_o$. In the Fourier analysis, FFT technique is applied after padding the data in a 256 M point window. The measurements of $\beta_1$ for the fiber sample showed standard deviations of 0.025% and 0.017% when directly calculating $L_o$ and when using Fourier analysis, respectively. For the waveguide, the measured standard deviations were 0.052% and 0.014% respectively. In both samples, Fourier analysis gave approximately a factor of 2 improvements in accuracy over the direct measurement of $L_o$. Another advantage of using Fourier analysis is that the multiple reflections from the sample facets have no effect on the measurement as only the location of the first peak is considered. This, in addition to the phase stability and the simplicity of the experimental setup, give our technique a major advantage over other interferometeric methods such as those based on Michelson or Mach-Zehnder interferometers.

The measured $\beta_1$ and $\beta_2$ for the twin-hole fiber show similar findings (difference less than 0.45%) to findings obtained from Michelson interferometer measurements with a 10 cm piece of the same fiber. The measured and simulated dispersion parameters for the waveguide (over a band between 1510-1610 nm) also show similar findings with differences less than 0.9%, which is within the expected range due to the uncertainties in the simulation parameters used.

What is claimed is:

1. An interferometer system for obtaining a measure of the chromatic dispersion of a waveguide comprising:
   a. a radiation source operable to emit radiation at a plurality of wavelengths;
   b. a means for separating incident and reflected waves connected to the radiation source, the means for separating incident and reflected waves possessing an output arm adjacent to a first end of the waveguide;
   c. an optical detector connected to the means for separating incident and reflected waves, the optical detector operable to record a Fabry-Perot interference pattern generated by a reflected test emission from the radiation source; and
   d. a means for determining an average fringe period of the Fabry-Perot interference pattern for at least three of the plurality of wavelengths and obtaining a first and second derivative of a propagation constant from the average fringe periods, the measure of chromatic dispersion being obtainable based on the first and second derivative of the propagation constant.

2. The interferometer system as claimed in claim 1 wherein said Fabry-Perot interference pattern consists of two waves wherein a first wave is a refection of the test emission from a first facet of the waveguide and a second wave is a reflection of the test emission from a second facet of the waveguide.

3. The interferometer system as claimed in claim 1 wherein said means for separating incident and reflected waves is a circulator.

4. The interferometer system as claimed in claim 1 wherein said means for separating incident and reflected waves is a 2-to-1 coupler.

5. The interferometer system as claimed in claim 1 wherein said interferometer is in the form of a single arm interferometer.

6. The interferometer system as claimed in claim 1 wherein said radiation source is a tunable laser.

7. The interferometer system as claimed in claim 1 wherein said optical detector is an optical spectrum analyser.

8. The interferometer system as claimed in claim 1 wherein the output arm of the means for separating incident and reflected waves comprises a launch waveguide terminating at an angle polished connector.

9. The interferometer system as claimed in claim 1 wherein the first end of the waveguide is a flat polished connector.

10. The interferometer system as claimed in claim 8 wherein the angle polished connector is cleaved at an angle to minimize reflection back to the circulator.

11. The interferometer system as claimed in claim 8 wherein the angle polished connector is aligned to the waveguide using a fastening means.

12. The interferometer system as claimed in claim 10 wherein the fastening means is operable to prevent damage to the angled polished connector by minimizing contact with the waveguide.

13. The interferometer system as claimed in claim 11 wherein the fastening means is a fiber connecting pin.

14. The interferometer system as claimed in claim 1 wherein the waveguide is selected from a group consisting of optical fiber, photonic crystal fiber, nanowire, nanofiber, and etched waveguide.

15. The interferometer system as claimed in claim 14 wherein the waveguide is a single mode fiber.

16. The interferometer system as claimed in claim 14 wherein the waveguide is a twin-hole fiber.

17. The interferometer system as claimed in claim 14 wherein the waveguide is a dispersion compensating fiber.

18. The interferometer system as claimed in claim 14 wherein the waveguide is a gain fiber.

19. The interferometer system as claimed in claim 1 wherein a minimum length of the waveguide for which the measure may be obtained is limited by a bandwidth of the radiation source.

20. The interferometer system as claimed in claim 19 wherein the bandwidth of the radiation source is in the order of tens to hundreds of nanometers and the minimum length of the waveguide is in the order of millimeters.

21. The interferometer system as claimed in claim 1 wherein the interferometer may be modularized and connected to a lightwave measurement system.

22. An interferometric method for obtaining a measure of the chromatic dispersion of a waveguide under test comprising the steps of:
  a. connecting a radiation source to a means for separating incident and reflected waves, said means for separating incident and reflected waves having an output arm comprising a launch waveguide terminating at an angle polished connector;
  b. placing a first facet of the waveguide under test adjacent to the angle polished connector;
  c. connecting the means for separating incident and reflected waves to an optical detector;
  d. generating a radiation emission at a plurality of wavelengths from the radiation source;
  e. recording an Fabry-Perot interferogram consisting of two waves with the optical detector wherein a first wave is a reflection of the radiation emission from the first facet of the waveguide under test and a second wave is a reflection of the radiation emission from a second facet of the waveguide under test; and
  f. determining an average fringe period of the Fabry-Perot interference pattern for at least three of the plurality of wavelengths and obtaining a first and second derivative of a propagation constant from the average fringe periods, the measure of chromatic dispersion being obtainable based on the first and second derivative of the propagation constant.

23. The interferometric method as claimed in claim 22 wherein the interferometer is common path.

24. The interferometric method as claimed in claim 22 wherein the average fringe period for each wavelength is determined by dividing the Fabry-Perot interference pattern into a plurality of overlapping fixed period wavelength bands and associating the average fringe period of each band with the centre wavelength of each band.

25. The interferometric method as claimed in claim 24 wherein the first derivative of the propagation constant for each wavelength is determined based on the average fringe period for each band and the length of the waveguide.

26. The interferometric method as claimed in claim 25 wherein the second derivative of the propagation constant is determined based on fitting the first derivative of the propagation constant for each wavelength to a polynomial.

* * * * *